(12) United States Patent
Bechara et al.

(10) Patent No.: US 6,465,559 B1
(45) Date of Patent: Oct. 15, 2002

(54) SIZING COMPOSITION

(75) Inventors: Ibrahim Bechara, Carmel, NY (US); Biau-Hung Chang, Basking Ridge, NJ (US); Pavel Ilmenev, Ridgefield, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/699,813

(22) Filed: Oct. 30, 2000

(51) Int. Cl.[7] .............................. C08K 5/01; C08L 9/08
(52) U.S. Cl. ........................ 524/487; 524/478; 524/539
(58) Field of Search ................ 524/539, 478, 524/487

(56) References Cited

U.S. PATENT DOCUMENTS

| | | | |
|---|---|---|---|
| 4,160,065 A | 7/1979 | Loewrigkeit et al. | |
| 4,240,944 A | * 12/1980 | Temple | 428/391 |
| 4,507,430 A | 3/1985 | Shimada et al. | |
| 4,644,030 A | 2/1987 | Loewrigkeit et al. | |
| 4,728,573 A | * 3/1988 | Temple | 428/328 |
| 5,389,718 A | 2/1995 | Potter et al. | |
| 5,672,653 A | * 9/1997 | Frisch et al. | 524/591 |
| 5,696,291 A | 12/1997 | Bechara et al. | |
| 5,723,518 A | 3/1998 | Kahl et al. | |

FOREIGN PATENT DOCUMENTS

| | | |
|---|---|---|
| EP | 718276 A2 | 6/1996 |
| JP | 10110024 | 4/1998 |

* cited by examiner

*Primary Examiner*—Kriellion A. Sanders
(74) *Attorney, Agent, or Firm*—Daniel Reitenbach

(57) ABSTRACT

A sizing composition which includes an anionic or cationic polyurethane dispersion, a polyolefin wax and a coupling agent.

18 Claims, No Drawings

SIZING COMPOSITION

BACKGROUND OF THE INVENTION

1. Field of the Invention

The invention pertains to a composition useful in treating glass fibers or mineral fillers in order to bond them to polyolefins to form reinforced composites. In one embodiment, the composition is applied to glass fibers and mineral fillers embedded in a polyolefin. The application of this composition to fibers and fillers significantly improves fiber strand integrity and adhesion between fibers or fillers and the polyolefin in which the fibers and/or fillers are disposed.

2. Description of the Prior Art

Although the use of polyolefins is widespread, certain applications require levels of dimensional stability, tensile and flexural strength/modulus and impact resistance not obtainable with polyolefins as such. To meet these demands, reinforced polyolefins have been developed; the typical reinforcing agent being glass fibers. Much of the strength advantage offered by these composites, however, depends on how well the glass fiber adheres to the polyolefin. For example, when there is sufficient bonding between the polyolefin and the glass, shock energy will be transferred to the more robust glass reinforcing agent when the composite is impacted; on the other hand, if the bond is inadequate, the energy will be deleteriously distributed and the composite will fracture. Moreover, some composite fabrications require the use of an extruder, the aggressive conditions of which will break up a coated filament if the integrity of the glass-to-polymer bond is too low.

In consequence, various techniques have been explored to improve the adhesion between the glass fiber and the polyolefin. The more prevalent of these involves the use of sizing compositions, which treat the glass fiber to facilitate adhesion with the polyolefin. Because the typical polyolefin effectively has no chemical moieties that are reactive, efforts to tailor the sizing composition to ameliorate bonding to the polyolefin have been assayed.

For example, U.S. Pat. No. 4,240,944 describes a sizing composition comprised of an aqueous emulsion containing isotactic carboxylated polypropylene, base and surfactant; the sizing agent can further contain a film former which can be, among other things, polyurethane.

U.S. Pat. No. 4,728,573 relates a sizing composition having one or more amino organo coupling agents, an aqueous emulsion of an acid or anhydride modified polyolefin having one or more surfactants, wherein the polyolefin is neutralized with an organic or inorganic base with a basicity less than the basicity of the amino moiety of the coupling agent, a binder stabilizer, one or more film forming polymers and water.

While carboxylating the polyolefin component manifests in some improvement, the coated glass fibers that result often have poor strand integrity, as well as color problems. Furthermore, carboxylated compositions typically have poor emulsive properties in the first instance which hamper implementation of this strategy inasmuch as emulsions are the industrially preferred method of coating glass fibers.

Polyurethanes are well known for their adhesive properties in various use settings, including binding fibers together. Polyurethanes as such, however, do not adhere well to polyolefins such as polypropylene. To facilitate matters, attempts have been made to employ polyurethanes as such in concert with carboxylated polyolefins. Although such efforts have generally improved glass processing aspects of this technology, the cost has been a diminishment in composite properties. Efforts to modify polyurethanes for such end uses have also been explored; for example, U.S. Pat. No. 4,507,430 discloses a water based polyurethane emulsion constituted of a hydrogenated polyalkadiene polyol component useful as an adhesive or coating material for polyolefin. Nonetheless, the results merit further improvement. Accordingly the utilization of polyurethanes in treating glass fibers for reinforcement of polyolefin matrices has been limited.

Hence the art recognizes a continuing need to develop better techniques for adhering glass fibers and polyolefins to produce stronger and more durable reinforced composites.

SUMMARY OF THE INVENTION

A new sizing composition has now been developed which is particularly appropriate for use as a coating composition of glass fibers and the like which is employed as a polyolefin reinforcing agent. This sizing composition employs a new polyurethane dispersion that very well adheres to a hydrophobic matrix such as that provided by polyolefins.

In accordance with the present invention a sizing composition is provided. The sizing composition of the present invention includes a polyurethane dispersion which is a reaction product of a prepolymer and a chain extender. The prepolymer is a reaction product of a hydroxylated polymer selected from the group consisting of polyether polyols, polyester polyols and mixtures thereof, a hydroxylated polyalkadiene, a polyisocyanate, a compound having a pendent acid group, optionally, an ester of a fatty acid having about 12 to about 20 carbon atoms containing hydroxyl groups, a coupling agent and a polyolefin wax.

Alternatively, the prepolymer is a reaction product of a hydroxylated polymer selected from the group consisting of polyether polyols, polyester polyols and mixtures thereof, a hydroxylated polyalkadiene, a polyisocyanate, a bis (hydroxyalkyl)quaternary ammonium group-containing diol and, optionally, an ester of a fatty acid having about 12 to about 20 carbon atoms containing hydroxyl groups.

DETAILED DESCRIPTION OF THE INVENTION

The sizing composition of the present invention includes a polyurethane dispersion, a coupling agent and a polyolefin wax. A first component of the sizing composition, a polyurethane dispersion, is a reaction product of a prepolymer and a chain extender. The prepolymer, in one preferred embodiment, is a reaction product of a hydroxylated polymer, a hydroxylated polyalkadiene, a polyisocyanate, a compound having a pendent acid group and, optionally, an ester of a hydroxylated fatty ester having between about 12 and about 20 carbon atoms. The chain extender is preferably an amine-containing compound.

The hydroxylated polymer in one preferred embodiment is a polyether polyol. Preferably, the polyether polyol is polyethylene glycol, polypropylene glycol or mixtures thereof.

In an alternate preferred embodiment the hydroxylated polymer is a polyester polyol. It is further preferred that the polyester polyol be poly(hexamethylene adipate/isophthalate) glycol or poly(hexamethylene orthophthalate) glycol.

A second component of the reaction product that produces the polyurethane dispersion prepolymer is a hydroxylated polyalkadiene. The hydroxylated polyalkadiene may or may not be hydrogenated. In those embodiments wherein the hydroxylated polyalkadiene is hydrogenated, any and all degrees of hydrogenation are within the contemplation of the present invention. In a particularly preferred embodiment, the hydroxylated polyalkadiene is a hydroxylated polybutadiene. Thus, a polybutadiene diol, whether or not partially or completely hydrogenated, is preferred.

A third component of the reaction product that forms the prepolymer is a polyisocyanate. Although any compound possessing at least two isocyanate groups is within the contemplation of the present invention, it is preferred that the polyisocyanate be a diisocyanate.

Both aliphatic and aromatic polyisocyanates may be utilized as a reactant in the formation of the prepolymer. However, aliphatic polyisocyanates are preferred. In view of these preferences it is apparent that aliphatic diisocyanates are particularly preferred. Thus, such aliphatic diisocyanates as isophorone diisocyanate (IPDI), hexamethylene diisocyanate, dicyclohexylmethane-4,4-diisocyanate and mixtures thereof are preferably employed in the formation of the prepolymer.

A fourth component of the reaction product which forms the prepolymer is a hydroxylated compound having a pendent acid group. The hydroxylated compound having a pendent acid group is preferably a hydroxylated compound having a pendent carboxylic acid group or hydroxylated compound having a pendent sulfonic acid group. Dimethylolpropionic acid (DMPA) and bis-hydroxyethyl aminoethane sulfonic acid (BES) are particularly preferred examples of the respective two preferred classes of compounds within the scope of the present invention.

An optional fifth component of the prepolymer is an ester of a fatty acid having from about 12 to about 20 carbon atoms containing hydroxyl groups. More preferably, the optional component is an ester of a fatty acid having about 15 to about 20 carbon atoms containing hydroxyl groups. Most preferably, the optional component is an ester of a fatty acid having about 18 carbon atoms containing hydroxyl groups. Thus, a particularly preferred embodiment of an ester of a fatty acid containing hydroxyl groups is glycerol monostearate.

In a second preferred embodiment the prepolymer reaction product is identical to the reaction product of the first preferred embodiment but for the substitution of a bis(hydroxyalkyl) quaternary group-containing diol for the hydroxylated compound having a pendent acid group in the first embodiment.

In this second preferred embodiment wherein a bis(hydroxyalkyl) quaternary grop-containing diol is present in the prepolymer reaction product, it is particularly preferred that the diol be bis(hydroxylated) quaternary ammonium methane sulfonate.

The prepolymer is reacted with a chain extender to form the polyurethane dispersion component of the coating composition of the present invention. The chain extender is preferably an amine compound. Of the amine-containing compounds within the scope of the chain extender of the present invention, hydrazine, isophorone diamine, aminoethylaminoethanol and polyalkylene diamines, such as hexamethylene diamine, are particularly preferred.

A second component of the sizing composition of the present invention is a coupling agent. As those skilled in the art are aware, coupling agents are organometallic compounds which improve adhesion between the fibrous reinforcement agent and the composite matrix. Among the coupling agents within the contemplation of the sizing composition of this invention, silanes are preferred. Specific silanes preferred for use in this application are aminosilanes and epoxysilanes. Other preferred coupling agents that may be used include methacrylate chromic chloride, titanium acetyl acetonate and the like.

A third component of the sizing composition is a polyolefin wax. Preferably, the polyolefin wax is a carboxylated polyolefin. More preferably, the carboxylated polyolefin is a carboxylated polyethylene, a carboxylated polypropylene or a mixture thereof.

To prepare the sizing composition the polyurethane dispersion is blended with an emulsion of the polyolefin wax in which the polyolefin wax, preferably a carboxylated polyolefin, is neutralized with a base. This blending operation is conducted under ambient temperature and pressure. The thus formed blend is diluted with water whereupon the coupling agent is added to the stirred blend.

In a preferred embodiment the aqueous sizing composition comprises between about 0.5% and about 4.0% polyurethane dispersion; between about 0.5% and about 4.0% polyolefin wax; between about 0.3% and about 0.6% coupling agent and the remainder water. The above percentages are by weight, based on the total weight of the aqueous sizing composition.

In a particularly preferred embodiment the sizing composition includes about 1.2% polyurethane dispersion, about 1.0% polyolefin wax and about 0.2% coupling agent, said percentages being by weight, based on solid content, the remainder being water.

The following examples are provided to illustrate the scope of the present invention. Because these examples are given for illustrative purposes only, the invention should not be deemed limited thereto.

EXAMPLE 1

Preparation of an Anionic Polyurethane Dispersion

An anionic polyurethane was prepared by introducing Fomrez ® 8066-72 (251.75 g), a polyester glycol available from Crompton Corp. and Polytail ® HA (44.43 g), a polyolefin diol produced by Mitsubishi Chemical Corp., into a glass reactor equipped with an overhead stirrer and a temperature controller. The reactor was heated to a temperature in the range of between 88° C. to 96° C. To this mixture was then added dicyclohexylmethane-4,4-diisocyanate (94.58 g). The product of this addition was stirred at a temperature of 88° C. to 104° for 3.5 hours.

The resultant product was analyzed and found to have a NCO concentration of 2.58% against a theoretical NCO concentration of 2.77%. Therefore, the reaction was allowed to be continued by heating the mixture at 88° C. to 104° C. for another hour. The resultant molten prepolymer was stored, under nitrogen, at 80° C. to 90° C.

A surfactant solution was prepared by dissolving a surfactant, an ethoxylated nonyl phenol (31.57g), and an antifoaming agent, SWS-2117 (0.63g), available from Wacker Chemie, in deionized water (215.83 g) at room temperature in a half gallon metal can.

The surfactant solution was cooled to about 10° C. after which triethylamine (4.70 g) was added. Thereupon, the earlier formed molten prepolymer (340 g) was slowly added to the surfactant solution. The resultant product was agitated for 40 minutes to completely disperse the prepolymer. Two chain extenders, ethylene diamine (3.50 g), dissolved in water (12.03 g), and adipic dihydrazide (5.56 g), slurried in water (5.56 g), was then slowly added. The product, a polyurethane dispersion, was stirred for 20 minutes and stored in a plastic bottle.

EXAMPLE 2

Preparation of an Anionic Polyurethane Dispersion

Poly(neopentyl adipate) glycol (665.0 g) (Fomrez ® 55–56, a product of Crompton Corp.), hydroxy-terminated polybutadiene having an average molecular weight of 2,400 (875.0 g) (Poly BD ® R45 HTLO, a product of Elf Atochem) and 1-methyl-2-pyrrolidinone (500.0g) (M-Pyrol) were charged into a 3-liter glass reactor equipped with an overhead stirrer and a temperature controller. The mixture was stirred and heated in the reactor, under a nitrogen atmosphere, for 10 minutes at a temperature of 65° to 70° C. Thereupon, isophorone diisocyanate (760.0 g) (IPDI) was added and the mixture stirred at a higher temperature, 86° C to 95° C., for 5 hours.

The reaction mixture was analyzed and found to have an NCO concentration of 3.25% against a theoretical NCO concentration of 3.45%. The reaction was then allowed to go on for another 0.5 hour under conditions existent during the first 5 hours of reaction. The resultant molten prepolymer was stored under nitrogen at a temperature of 80° C. to 90° C.

EXAMPLES 3 to 10 AND COMPARATIVE EXAMPLE 1

Preparation of Anionic Polyurethane Dispersions

A series of eight additional anionic polyurethane dispersions within the scope of the present invention and one outside its scope were prepared in accordance with the procedure set forth in Examples 1 and 2.

These examples are summarized, along with Examples 1 and 2, in Table 1.

TABLE 1

| Anionic PUD of Ex. No. | Hydroxylated Polymer, g. | Hydroxylated Polyalkadiene, g. | Compd. With Pendent Acid Salt, g. | Diisocyanate, g | M-Pyrol, %[13] |
|---|---|---|---|---|---|
| 1 | Fomrez ® 8066-72[1], 251.75 | Polytail ® HA[7], 44 43 | DMPA[10], 6.47 | H12MDI[11], 6.47 | -0- |
| 2 | Fomrez ® 55-56[2], 665.0 | PolyBD ® R45 HTLO[8], 875.0 | DMPA, 200.00 | IPDI[12], 760.0 | -0- |
| 3 | Fomrez ® 8066-72, 55.80 | Polytail ® HA[8], 18.60 | DMPA, 1.84 | H12MDI, 23.76 | -0- |
| 4 | Fomrez ® 8066-72, 55.80 | Polytail ® H[9], 18.60 | DMPA, 1.84 | H12MDI, 23.76 | -0- |
| 5 | Fomrez ® 8066-37[3], 26.66 | PolyBD ® R45 HTLO, 21.71 | DMPA, 7.08 | IPDI, 24.55 | 20 |
| 6 | Poly-G ® 20-112[4], 53.39 | PolyBD ® R45 HTLO[8], 17.80 | DMPA, 2.14 | IDPI, 26.67 | -0- |
| 7 | Fomrez ® 8066-37, 24.27 | PolyBD ® R45 HTLO[8], 24.28 | DMPA, 7.00 | IPDI, 24.43 | 20 |
| 8 | Pripol ® 2033[5], 14.26 | PolyBD ® R45 HTLO[8], 42.78 | DMPA, 4.75 | IPDI, 27.51 | 10 |
| 9 | Poly-G ® 20-56[6], 52.93 | PolyBD ® R45 HTLO[8], 17.64 | DMPA, 3.53 | IPDI, 20.90 | 10 |
| 10 | Poly-G ® 20-112, 17.80 | PolyBD ® R45 HTLO[8], 25.43 | DMPA, 6.00 | IPDI, 33.13 | 10 |
| CE 1 | Fomrez ® 8066-72, 296.18 | None | DMPA, 6.47 | H12MD, 6.47 | -0- |

[1]Polyester glycol, produced by Crompton Corp.
[2]Poly(neopentyl adipate) glycol, produced by Crompton Corp.
[3]Polyester glycol, produced by Crompton Corp.
[4]Polypropylene glycol, produced by Arch Chemical.
[5]C36 dimer diol, produced by Unichema International.
[6]Polyethylene glycol, produced by Arch Chemical.
[7]Partially hydrogenated polyalkadiene diol (polyolefin diol), produced by Mitsubishi Chemical Corp.
[8]Hydroxy-terminated polybutadiene, avg mol wt. 2400, produced by Elf Atochem.
[9]Partially hydrogenated polyalkadiene diol (polyolefin diol), produced by Mitsubishi Chem. Corp.
[10]Dimethylol propionic acid.
[11]Dicyclohexylmethane-4,4-diisocyanate.
[12]Isophorone diisocyanate.
[13]1-Methyl-2-pyrrolidinone, % based on total prepolymer weight including solvent.

An aqueous triethylamine solution was prepared by dissolving triethylamine (TEA) (161.8 g) in deionized water (3695 g), at room temperature, in a 5-gallon container. To this solution was slowly added molten prepolymer (2925 g), prepared as above. The prepolymer was completely dispersed by vigorously stirring the mixture for 30 minutes. A chain extender, 35% aqueous hydrazine solution (93.2 g), was then slowly added under agitation. The resultant dispersion was stirred for 30 minutes, filtered and stored in a plastic pail. The dispersion was analyzed and found to have a solids content of 38.6%.

EXAMPLE 11

Preparation of a Cationic Polyurethane Dispersion

Polypropylene glycol (123.4 g) having an average molecular weight of 1000 (Poly-G ® 20–112, a product of Arch Chemical), hydroxy-terminated polybutadiene (40.9 g) having an average molecular weight of 2400 (Poly BD ® R45HTLO, a product of Elf Atochem), N,N-dimethyl bis-hydroxyethyl quaternary ammonium methane sulfonate (22.9 g), IPDI (82.7 g) and M-Pyrol (30 g) were charged into a glass reactor equipped with an overhead stirrer and temperature controller. The mixture was allowed to react at about 80° C. under a nitrogen atmosphere until the NCO concentration reached its calculated value of 4.8% (about 3 hours).

The thus formed prepolymer was dispersed in water (469.4 g) containing a defoamer (0.8 g). Upon complete dispersion of the prepolymer, the dispersion self extended by being left overnight at room temperature due to the reaction between the diisocyanate and water. The resultant stable cationic polyurethane dispersion had a solids content of 35% and viscosity of 30 cps, as measured by Brookfield LVF, spindle #3 at 60 rpm.

EXAMPLES 12 and 13

Preparation of Cationic Polyurethane Dispersions

Two additional cationic polyurethane dispersions, Examples 12 and 13, were prepared in accordance with the procedure of Example 11. These cationic dispersions are summarized, along with the dispersion of Example 11, in Table 2.

TABLE 2

| Cationic Dispersion of Exam No. | Hydroxylated Polymer, g | Hydroxylated Polybutadiene[1], g | Bis-(hydroxyalkyl)-quaternary ammonium diol[2], g | Diisocyanate[3], g | M-Pyrol, %[4] |
|---|---|---|---|---|---|
| 11 | Poly-G ® 20-112[5], 123.4 | 40.9 | 22.9 | 82.7 | 30.00 |
| 12 | Poly-G ® 20-112[5], 29.08 | 15.66 | 7.02 | 26.41 | 17.47 |
| 13 | Fomrez ® 8066-37[6], 29.06 | 23.66 | 8.13 | 19.15 | 20.00 |

[1]Poly BD ® R45 HTLO hydroxy-terminated polybutadiene having an average molecular weight of 2400, produced by Elf Atochem.
[2]N,N-dimethyl bis-hydroxyethyl quaternary methane sulfonate.
[3]Isophorone diisocyanate
[4]1-Methyl-2-pyrrolidinone, % based on total weight of prepolymer and solvent.
[5]Propylene glycol having an average molecular weight of 1000.
[6]Poly(hexamethylene adipate/isophthalate) glycol, produced by Crompton Corp.

EXAMPLES 14–28 and COMPARATIVE EXAMPLES 2–8

Preparation of Sizing Compositions

The polyurethane dispersions of Examples 1–13 were blended with a base neutralized acid modified polypropylene at ambient temperature under agitation. The resultant stirred mixture was diluted with deionized water. A silane coupling agent, aminosilane, was added, with stirring, to the diluted aqueous mixture.

A summary of the sizing compositions produced in these examples is provided in Table 3.

TABLE 3

| Sizing Composition of Example No. | Polyurethane Dispersion of Example No., g | Polyolefin Wax, g | Water, g | Coupling Agent, g |
|---|---|---|---|---|
| 14 | 1, | Epolene ® E-43[1] | | Aminosilane, 0.9 |
| 15 | 3,12.4 | Epolene ® E-43,8.0 | 128.7 | Aminosilane, 0.9 |
| 16 | 4, 12.4 | Epolene ® E-43, 8.0 | 128.7 | |
| 17 | 1, | AC 596[2], | | |
| 18 | 2, | AC 596, | | |
| 19 | 3, | AC 596, | | |
| 20 | 5, | AC 596, | | |
| 21 | 6, | AC 596, | | |
| 22 | 7, | AC 596, | | |
| 23 | 8, | AC 596, | | |
| 24 | 9, | AC 596, | | |
| 25 | 10, | AC 596, | | |
| 26 | 11, | AC 596, | | |
| 27 | 12, | AC 596, | | |
| 28 | 13, | AC 59, | | |
| CE2 | None | Epolene ® E-43, 26.6 | 122.5 | Aminosilane, 0.9 |
| CE3 | CE1, 17.2 | None | 131.9 | Aminosilane, 0.9 |
| CE4 | CE1, 12.0 | Epolene ® E-43, 8.0 | 129.1 | Aminosilane, 0.9 |
| CE5 | 1, | None | | |
| CE6 | 2, 17.8 | None | | |
| CE7 | 3, 17.8 | None | | |
| CE8 | None | AC 596, | 131.3 | Aminosilane, 0.9 |

[1]Base neutralized acid modified polypropylene with a solids content of 40%, produced by Eastman Chemical.
[2]Base neutralized acid modified polypropylene with a solids content of 29%, produced by Allied-Signal.

EXAMPLE 39

Peel Adhesion Test

Seven sizing compositions, within and outside the scope of the present invention, summarized in Table 3, were tested to determine their peel adhesion strength.

The samples tested were prepared by soaking glass mats with the subject sizing compositions. The soaked mats were dried by exposing them to ambient temperature for 30 minutes followed by heating at 135° C. for 5 minutes. The sized glass mats, having a thickness of 1 mil, were sandwiched between identical 1.7 mil thick polypropylene sheets. These three-ply laminates were prepared in a hot press using ⅛ inch metal spacers between metal plates under a ram pressure of 2,000 psi and a temperature of 204° for 30 minutes.

The resultant laminates were tested on an Instron ® Model 4500. The results of this test are summarized in Table 4.

TABLE 4

| Sizing Composition of Example No. | LOI, %[1] on Glass Mat | Peel Adhesion, lb/in. |
|---|---|---|
| CE2 | 3.08 | 3.2 |
| CE3 | 3.12 | 3.6 |
| CE4 | 3.04 | 3.9 |
| CE6 | 3.19 | 3.5 |
| CE7 | 3.35 | 3.8 |
| 15 | 3.40 | 6.4 |
| 16 | 3.24 | 5.2 |

[1]Concentration of sizing agent based on the total weight of the sized glass mat.

EXAMPLE 40

Testing of Flexural Properties

A series of laminates were prepared in accordance with the procedure of Example 39 employing 21 of the sizing compositions, within and outside the scope of the present invention, summarized in Table 3. In conducting this test the laminates were cut into 2 inch wide strips.

The flexural properties, flexural strength and flexural modulus, of the samples were thereupon determined in accordance with ASTM Test Procedure No. D790 using an Instron ® Model 450.

The results of this test are summarized in Table 5.

TABLE 5

| Sizing Composition of Example No. | LOI, % | Flexural Strength, psi | Flexural Modulus, Kpsi |
|---|---|---|---|
| CE2 | 1.06 | 7,600 | 220 |
| CE3 | 1.01 | 4,800 | 145 |
| CE4 | 1.01 | 6,600 | 190 |
| CE5 | 1.01 | 6,400 | 180 |
| 14 | 1.04 | 7,300 | 195 |
| 16 | 1.14 | 7,900 | 200 |
| CE8 | 1.01 | 7,600 | 200 |
| 17 | 1.01 | 7,600 | 210 |
| CE6 | 1.07 | 7,900 | 285 |
| 18 | 0.97 | 8,800 | 300 |
| 19 | 1.01 | 8,100 | 260 |
| 20 | 1.01 | 8,300 | 260 |
| 21 | 1.13 | 7,800 | 220 |
| 22 | 0.99 | 8,100 | 270 |
| 23 | 1.08 | 8,000 | 260 |
| 24 | 1.07 | 7,500 | 240 |
| 25 | 1.07 | 8,100 | 240 |
| CE6 | 0.97 | 6,600 | 190 |
| 26 | 1.14 | 6,700 | 200 |
| 27 | 1.08 | 6,900 | 215 |
| 28 | 1.02 | 7,900 | 255 |

The above embodiments and examples are provided to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A sizing composition comprising a polyurethane dispersion, said polyurethane dispersion being a reaction product of a prepolymer and a chain extender, said prepolymer being a reaction product of a hydroxylated polymer, said hydroxylated polymer selected from the group consisting of a polyether polyol, a polyester polyol and mixtures thereof, a hydroxylated polyalkadiene, a polyisocyanate, a hydroxylated compound having a pendent acid group and, optionally, an ester of a fatty acid having about 12 to about 20 carbon atoms containing hydroxyl groups; a polyolefin wax; and a coupling agent.

2. A sizing composition comprising a polyurethane dispersion, said polyurethane dispersion being a reaction product of an extended prepolymer, including a hydroxylated polymer selected from the group consisting of a polyether polyol, a polyester polyol and mixtures thereof, a hydroxylated polyalkadiene, a polyisocyanate, a bis(hydroxyalkyl) quaternary ammonium group-containing diol and, optionally, an ester of a fatty acid having about 12 to about 20 carbon atoms containing hydroxyl groups; a polyolefin wax; and a coupling agent.

3. A sizing composition in accordance with claim 1 or 2 wherein said coupling agent is a silane, methacrylate chromic chloride or titanium acetyl acetonate.

4. A sizing composition in accordance with claim 3 wherein said coupling agent is a silane, said silane selected from the group consisting of aminosilanes and epoxysilanes.

5. A sizing composition in accordance with claim 1 wherein said polyolefin wax is a carboxylated polyolefin.

6. A sizing composition in accordance with claim 2 wherein said polyolefin wax is a carboxylated polyolefin.

7. A sizing composition in accordance with claim 5 wherein said carboxylated polyolefin is selected from the group consisting of carboxylated polyethylene, carboxylated polypropylene and mixtures thereof.

8. A sizing composition in accordance with claim 6 wherein said carboxylated polyolefin is selected from the group consisting carboxylated polyethylene carboxylated polypropylene and thereof.

9. A sizing composition in accordance with claim 1 or 2 wherein said hydroxylated polymer is a polyether polyol, said polyether polyol selected from the group consisting of polyethylene glycol and polypropylene glycol.

10. A sizing composition in accordance with claim 1 or 2 wherein said hydroxylated polymer is a polyester polyol, said polyester polyol selected from the group consisting of poly(hexamethylene adipate/isophthalate) glycol and poly(hexamethylene orthophthalate) glycol.

11. A sizing composition in accordance with claim 1 or 2 wherein said hydroxylated polyalkadiene is partially or fully hydrogenated.

12. A sizing composition in accordance with claim 1 wherein said hydroxylated polyalkadiene is a hydroxylated polybutadiene.

13. A sizing composition in accordance with claim 1 or 2 wherein said polyisocyanate is an aliphatic diisocyanate.

14. A sizing composition in accordance with claim 1 or 2 wherein said chain extender is an amine compound.

15. A sizing composition in accordance with claim 1 or 2 wherein said optional ester containing about 12 to 20 carbon atoms containing hydroxyl groups is present and is glycerol monostearate.

16. A sizing composition in accordance with claim 1 wherein said hydroxylated compound having a pendent acid group is selected from the group consisting of a hydroxylated compound having a pendent carboxylic or a hydroxylated compound having a pendent sulfonic acid.

17. A sizing composition in accordance with claim 16 wherein said hydroxylated compound having a pendent acid group is selected from the group consisting of dimethylolpropionic acid and bis-hydroxyethyl aminoethane sulfonic acid.

18. A sizing composition in accordance with claim 2 wherein said bis(hydroxyalkyl) quaternary ammonium group-containing diol is N,N-dimethyl bis(hydroxyethyl) quaternary ammonium methane sulfonate.

* * * * *